United States Patent [19]
Russell

[11] Patent Number: 4,531,884
[45] Date of Patent: Jul. 30, 1985

[54] AUTOMATED MACHINE

[76] Inventor: Richard H. Russell, Box 312, Farmington, Conn. 06032

[21] Appl. No.: 441,641

[22] Filed: Nov. 15, 1982

[51] Int. Cl.³ .............................................. B66C 1/00
[52] U.S. Cl. ..................... 414/729; 901/15; 901/26; 192/48.9; 74/665 H
[58] Field of Search ...................... 901/25, 26, 15, 17, 901/19; 414/729; 192/48.9, 18 B, 12 D; 74/665 H, 479

[56] References Cited

U.S. PATENT DOCUMENTS

| | | | |
|---|---|---|---|
| 2,959,301 | 11/1960 | Willsea | 901/26 X |
| 3,006,209 | 10/1961 | Stromberg | 192/48.9 |
| 3,108,498 | 10/1963 | James et al. | 901/25 X |
| 4,300,082 | 11/1981 | Angersbach | 192/12 D |

Primary Examiner—Joseph E. Valenza
Assistant Examiner—Dennis Williamson
Attorney, Agent, or Firm—Allan Redrow

[57] ABSTRACT

This invention relates to a production tool adapted to be automated and more particularly to such a system having a single drive motor and a plurality of clutch and brake controlled gear systems that may be actuated to move the tool longitudinally from place to place, the tool means having a housing for enclosing the motor and its controls, the housing supporting a fully articulated, power driven load engaging and carrying means that may be controlled to precisely position the load engaging means that is operatively mounted on the end of such articulated means.

6 Claims, 7 Drawing Figures

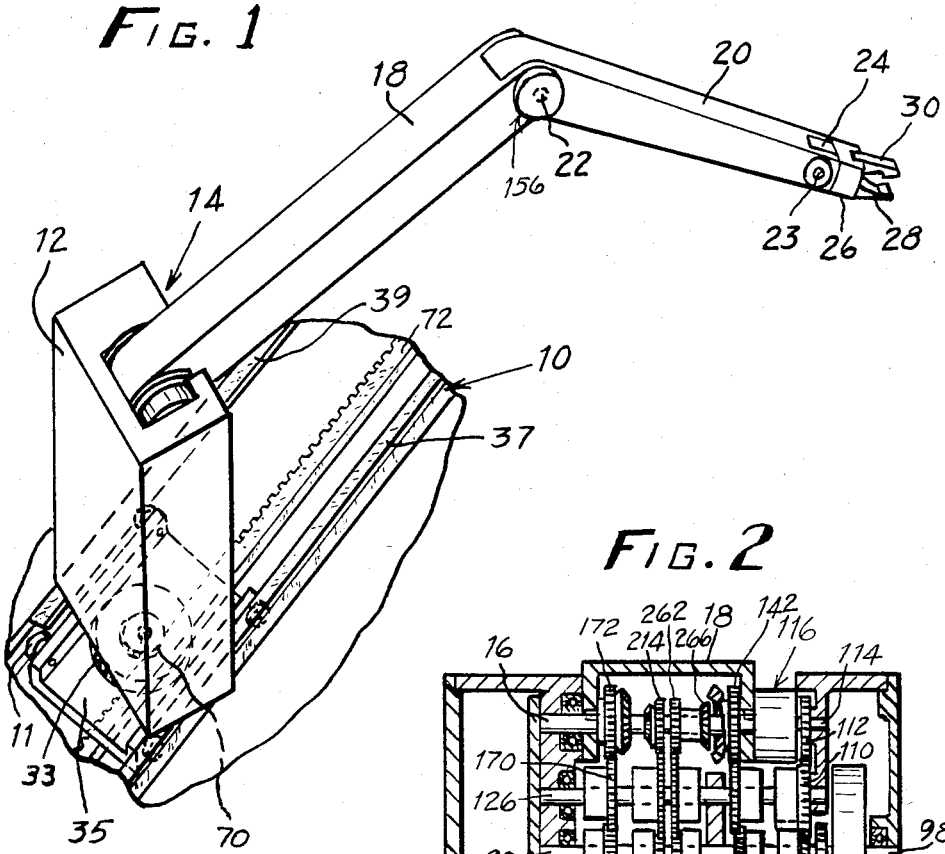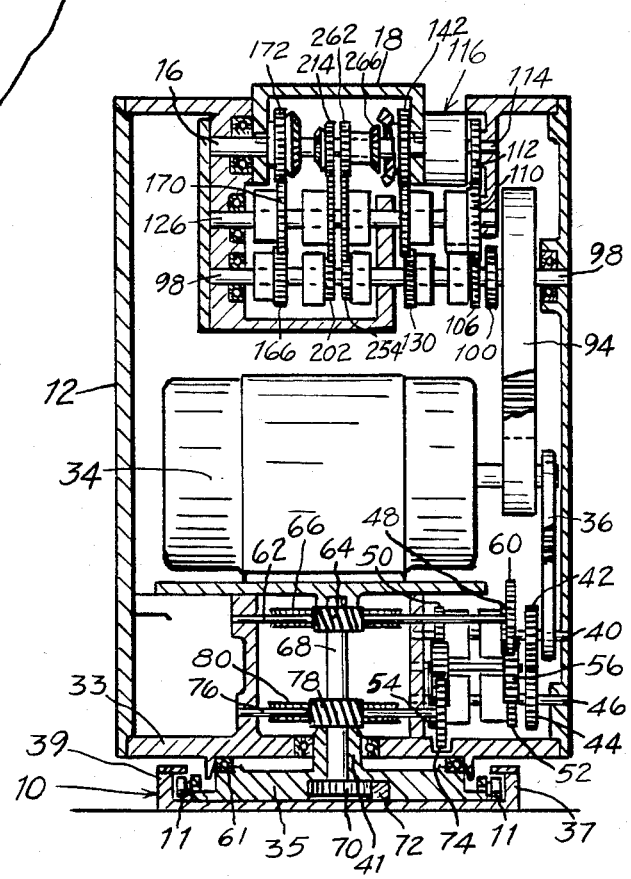

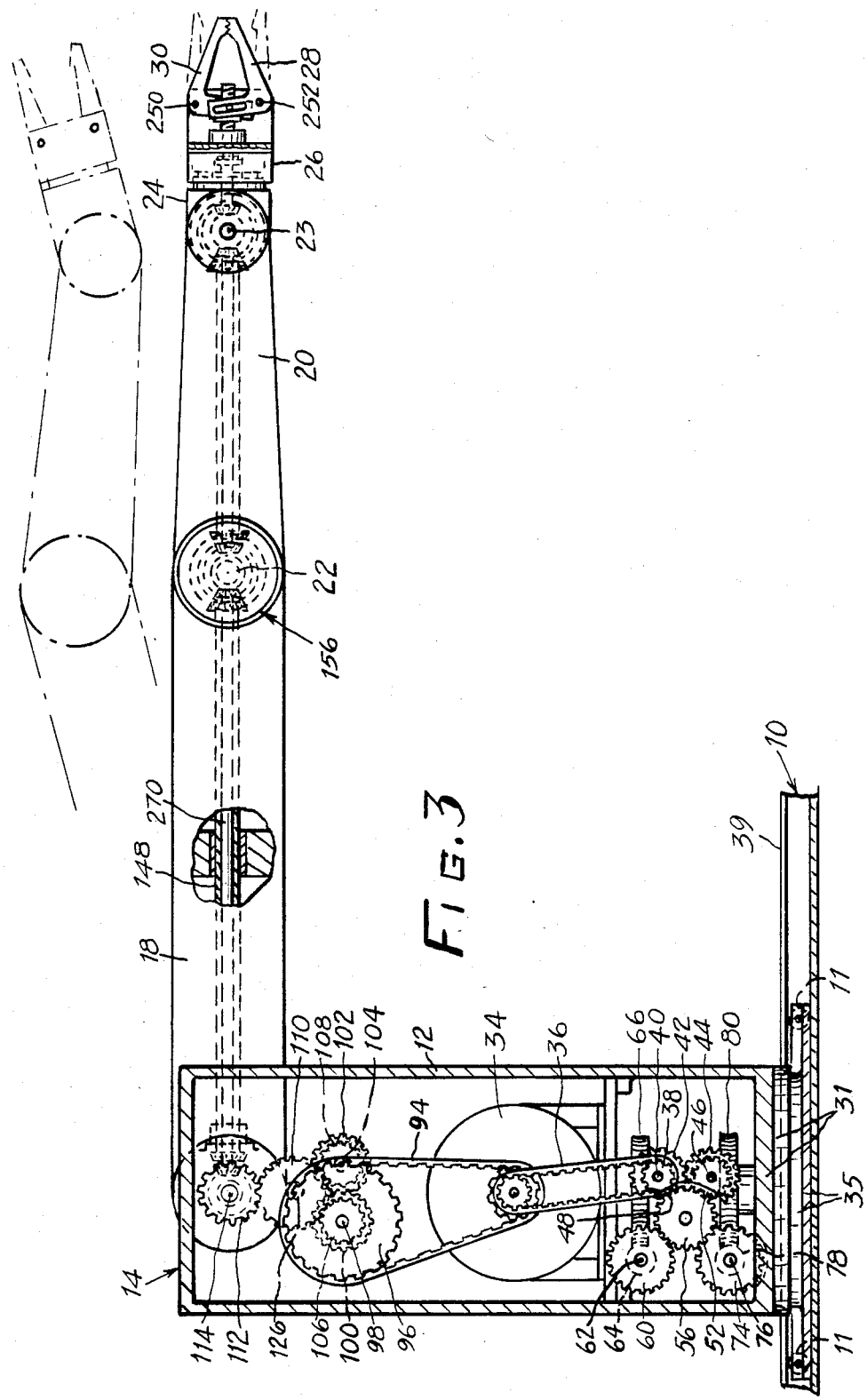

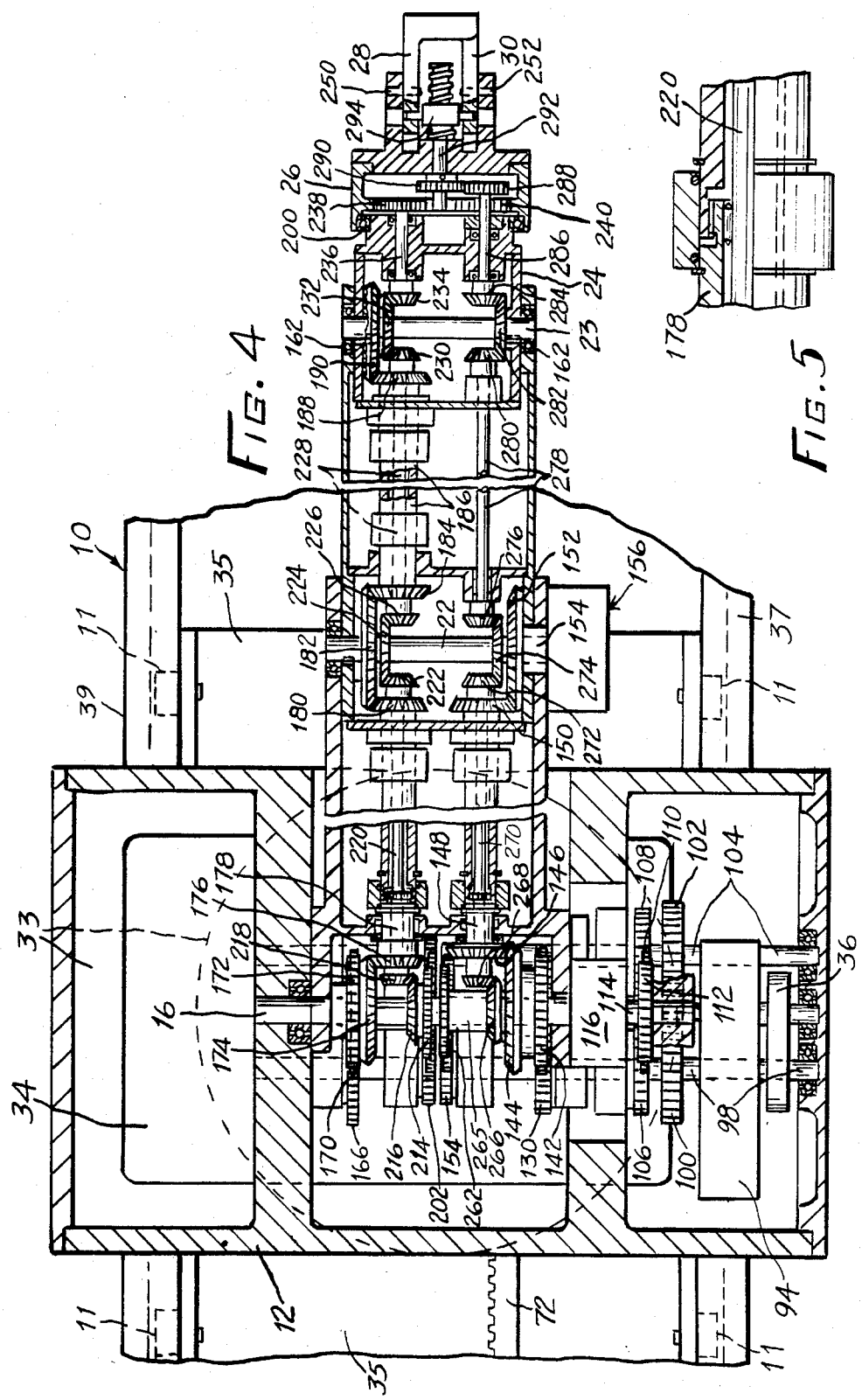

AUTOMATED MACHINE

PRIOR ART

U.S. Pat. Nos. to Hanlotto 3,286,852 of Nov. 2, 1966; Haskins 3,143,004 of Aug. 4, 1964; Putnam 142,511 of Sept. 2, 1973 and Carson 3,083,580 of Apr. 2, 1936 all show structures of general interest with respect to this present invention. They show single motor drive means for a number of driven shafts associated with means to control the direction of rotation of the variously driven shafts. Carson describes an automated sewing machine having a number of elements driven in a coordinated relationship to produce various patterns of stitches in response to data fed into a suitable control means.

BRIEF DESCRIPTION OF THIS INVENTION

The tool shown here includes a track means for supporting a housing element for longitudinal travel in either direction along the track. The housing also has an ability to turn about a vertical axis and supports articulated load supporting and carrying means. An upper member is pivoted on the housing to be raised and lowered around a bearing and a second element is mounted at the other end of the upper member to rotate on an axis independently at the free end of the upper member and is of course raised and lowered with the upper member as it is oscilated. The second element supports an angulating and twisting means at its other end. This means moves with the free end of the second element and is designed to be rotated about the longitudinal axis of the second element and it may also be driven to angulate about an axis at right angles to said longitudinal axis. The rotating and angulating member is designed to support one or more moveable load engaging means pivotally upon its body, which means can be driven between an open and closed position to firmly grasp and hold or release the engagement of this means with the load.

A suitable motor and clutch and brake controls are provided that are disposed wholly within the housing, to power drive means that are connected to the various operating systems to move the housing and operate the articulated load carrying and load engaging means. The clutch and brake means are operative to coordinate the movements of these respective elements, which controls may be electrically powered and automated with conventional computer controls in order to effect an entirely automatic operation of the tool through a programmed series of movements.

IN THE DRAWINGS

FIG. 1 is a perspective view of one embodiment of the tool of this invention;

FIG. 2 is a sectional elevation of the housing element of the tool;

FIG. 3 is a sectional elevation of the housing taken at right angles to the view in FIG. 2 and showing the associated articulated load handling means;

FIG. 4 is a top plan view of FIG. 2;

FIG. 5 is a detail view showing rotatable mounting of the rotating and angulating element at the end of the second articulated element;

DETAILED DESCRIPTION

Figure 6:
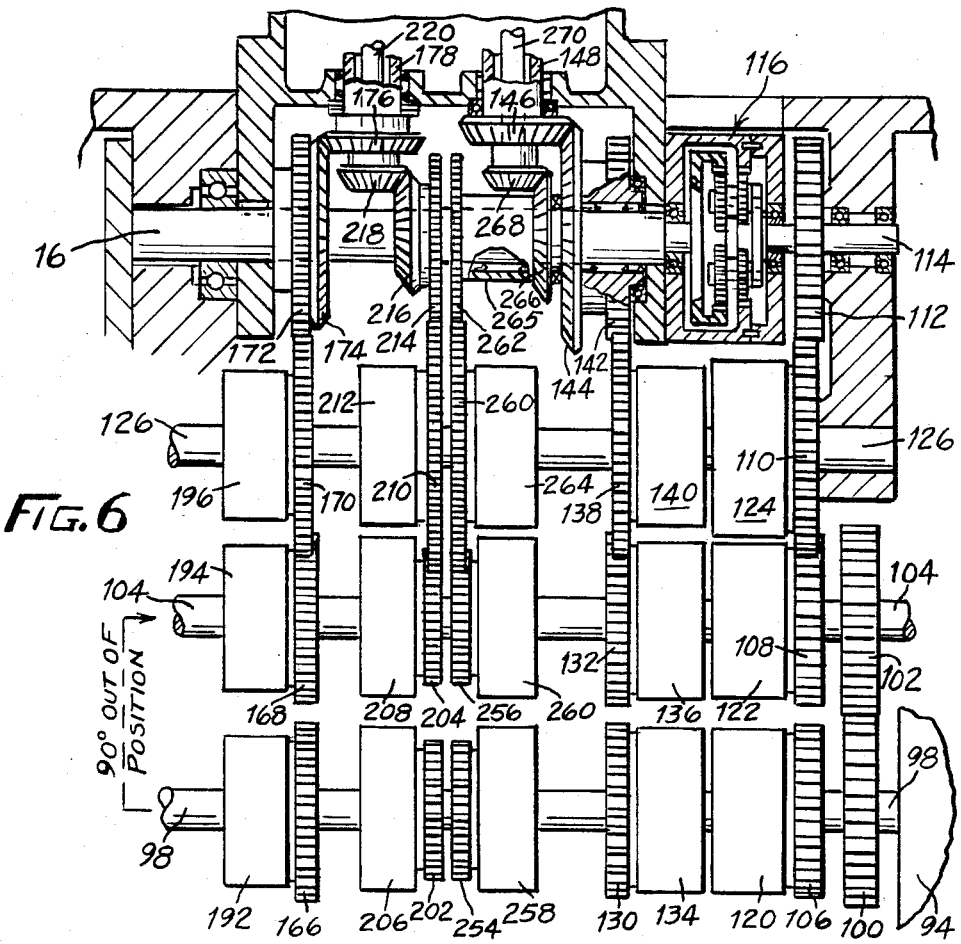
FIG. 6 is a sectional top plan view of the drive systems for the several articulated load supporting elements.

Referring to FIGS. 1 and 2 the overall tool assembly is shown which includes a track means 10 having any desired path for supporting a housing 12. The housing is mounted on the track 10 and has a generally vertically disposed axis that remains upright as the tool moves in either direction along track means 10. The housing may also be rotated around its vertical axis in either a clockwise or counter-clockwise direction. The housing has an upper portion indicated by arrow 14 having a horizontal bearing 16 for supporting an upper articulated member 18. The upper member oscillates around bearing 16 in a vertical plane and of course swings integrally with the housing and its bearing 16 in a horizontal arc when the housing is rotated. The upper member extends from its inner end on the bearing 16 to an outer end, which supports a second articulated element 20. The second element 20 has an inner end mounted on suitable bearing means 22, the second element being driven to swing in a generally vertically disposed plane around the horizontal bearing 22. The second element extends from the bearing 22 to its outer end having a bearing 23 therein to support an angulating member 24. The means 24 angulates in an arc in a generally vertical plane and member 24 supports a member 26 that rotates around the longitudinal axis of member 24. This angulating and twisting means supports load engaging means 28 and 30 that pivot about bearings on the twisting means 26, which load engaging means are powered one relative to the other to move between open and closed positions to release and engage an object.

As best seen in FIG. 2 the housing has a rolling support on wheels 11 in track 10 for longitudinal movement in either direction along the track and drive means for producing the desired movement will be described below. The housing provides an enclosure for the drive motor for moving the housing and the articulated load carrying means as well as enclosing a portion of the drive systems and all of the more delicate controls for activating the several drive systems.

The unit may be designed for handling light loads but preferably will be used in situations where heavy pieces weighing up to as much as 400 lbs. or more can be picked up, transported and deposited with precision movements. The device is organized to operate two, three, four or even five elements individually or simultaneously while moving the housing along its track. The pieces to be handled may be small or large and be light or heavy, the robot here described can be made in a small or large size to operate with a degree of precision to handle a wide variety of production situations as will appear more fully from the description that follows.

An electrically powered motor 34 is preferably supported within housing 12 to effect the powered movements of the several mechanisms described above, the motor may be of any size desired depending upon the load to be lifted but with the gear trains described below, a relatively low powered motor may be made to pick up and transport heavy loads with this tool while simultaneously moving the articulated and twisting elements to position the piece being transported for deposit at its destination. Suitable electrically actuated controls are also provided within the housing for coordinating the operations of the various drive systems for the several articulated means forming this tool system, as will be described more fully below. The motor and all of these controls which may include electrically operated clutch and brake means are enclosed within the housing for protection as well as convenience in servicing all of the electrical components of the machine.

The housing is moved along the track and rotated about its longitudinal axis by the drive arrangement shown in FIGS. 2 and 3. The motor is supported on a stand 31 having a floor 33 rotatably supported above a square carriage 35 see FIG. 1 that is slidably mounted on wheels 11 in guide rails 37 and 39 integral with the base support for track 10 for the tool. The carriage 35 has an integral tubular bearing means 41 mounted centrally thereof to support a worm gear integral with its upper end for a purpose that will appear more fully below.

Figure 7:
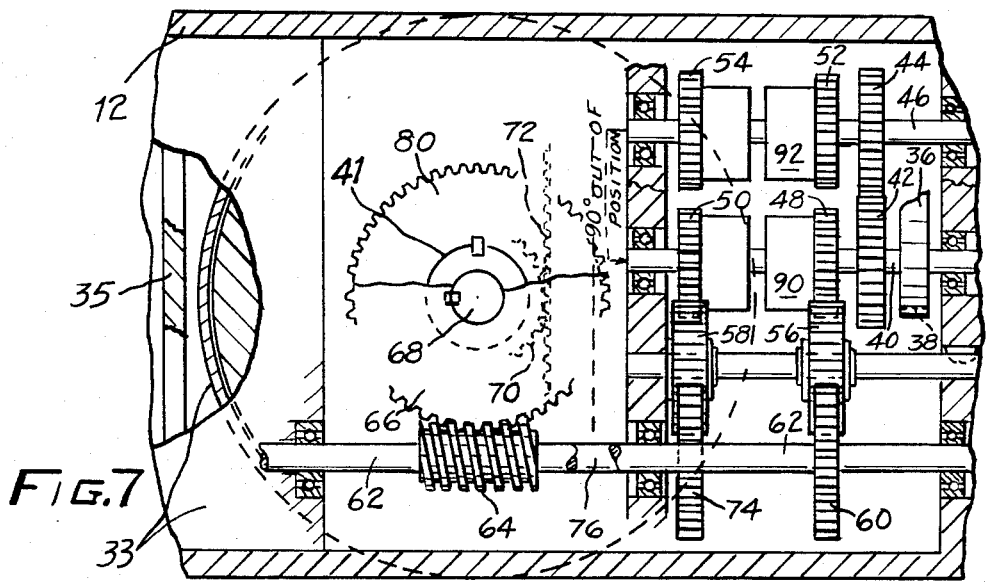
FIG. 7 is a sectional detail in plan view showing the worm drive system for moving the housing on its track and rotating the housing about its vertical axis.

Motor 34 drives a system enclosed within the housing and supported on the floor 33 that includes a drive belt 36 to rotate pulley 38 that is keyed to shaft 40. Driven shaft 40 has a spur gear 42 keyed to it which meshes with spur gear 44 that is keyed to shaft 46. As best seen in FIGS. 2, 3 and 7 shafts 40 and 46 rotate in opposite directions and shaft 40 supports free wheeling spur gears 48 and 50 while shaft 46 supports free wheeling spur gears 52 and 54. Gears 48 and 52 each mesh with an idler gear 56 and gears 50 and 54 mesh with an idler gear 58. Idler gear 56 meshes also with a spur gear 60 keyed to worm gear drive shaft 62 that drives worm 64 integral with the shaft that meshes with worm wheel 66. Wheel 66 drives the vertically disposed shaft 68 rotatably supported within the tubular bearing means 41, the shaft 68 driving spur gear 70 that cooperates with rack 72 fixed to the foundation for the tool to drive the carriage 35 along tracks 37 and 39 as gear 70 is rotated in one direction or the other as will appear more fully below.

The idler 58 meshes with spur gears 50 and 54 and also with spur gear 74 keyed to shaft 76 that drives worm 78 that meshes with worm wheel 80 that is integral with the upper end of the tubular bearing 41. The bearing 41 is supported integrally with the carriage 35 that can only move along track 10 so that worm wheel 80 is thus relatively fixed while the floor 33 that rides on bearings 61 is caused to rotate about bearing 41 when worm 78 is rotated, the worm 78 in effect pushes against a fixed worm wheel 80 and thus causes floor 33 of the housing and all of the elements supported within the housing 12 to rotate about the generally vertically disposed axis of the tubular bearing means 41.

The drive from the respectively oppositely rotating drive shafts 40 and 46 are transmitted through the worm gear drive trains described above to the means for causing the tool to selectively simultaneously or separately move to or fro along the track 10 and/or rotate in either direction about the axis that extends vertically through tubular bearing 41.

To effect the engagement of these respective drive trains, to cause the housing to move in one direction or the other or to cause the housing to rotate clockwise or counter clockwise under the control of automating means, an electrically operated clutch means 90 of any conventional design is provided that is effective to engage the otherwise freewheeling spur gear 48 with shaft 40 and a similar clutch 92 is operative to engage freewheeling spur 52 with shaft 46. Clutches 90 and 92 are either both inactive if the housing is to remain stationary or one or the other only is energized so that for example idler 56 that meshes with spur gears 48 and 52 is driven by one or the other of the spur gears 48 or 52 whereby worm gear 64 is driven by idler 56 in one direction or the other to move the housing along track 72 or idler 58 meshing with gears 50 and 54 is driven in one direction or the other to drive worm 78 to rotate the housing in one direction or the other about its vertical axis. The control means may be operated independently one with respect to the other and thus the housing may be rotated as it moves along track 10 or it may be moved along the track without a simultaneous rotation or it may be rotated in a desired direction only while the housing remains in one position on the track.

Referring to FIGS. 2, 3 and 4 the motor 34 also drives belt 94 that drives pulley 96. This drive system is supported with the housing on floor 33 and as seen pulley 96 is keyed to a drive shaft 98 that has spur gear 100 keyed to it. Spur gear 100 meshes with spur gear 102 keyed to shaft 104 so that drive shafts 98 and 104 rotate in opposite directions respectively. These drive shafts provide power to gear trains adapted to operate the various articulated load carrying means. Suitable automated clutch and brake means are built into these gear trains to coordinate the relative simultaneous or individual movement of or fix the relative positioning of these load carrying parts. These oppositely rotating drive shaft means are situated within the upper portion of the housing. It is conceivable that a braking action could be accomplished by engaging one clutch in opposition to the other to lock the gear train to hold the articulated element stationary but in the preferred tool, separate brake elements are provided to hold that element immobile.

The upper articulated load supporting member 18 is pivotally mounted on a generally horizontally disposed bearing shaft 16 supported at the portion 14 of housing 12. The upper member is driven to oscilate about this bearing in a generally vertical plane.

As best seen in FIG. 6 oscilating movement is produced in the upper member 18 through a gear train drive that includes a pair of free wheeling spur gears 106 and 108 mounted, one each of said pair respectively, on the oppositely rotating drive shafts 98 and 104. These two gears both mesh with idler gear 110 that is carried to free wheel on a fixed shaft 126, idler 110 meshing with gear 112 keyed to shaft 114 that is the rapidly rotating input shaft to an epicyclic gear set contained within an enclosure indicated by arrow 116 the enclosure being carried on the upper part of the housing so that the slow moving output from the epicyclic gear means can transmit power to the upper member 18 to cause it to rotate in one direction or the other about bearing 16.

The idler gear 110 is driven in one direction or the other by one or the other of spur gears 106 or 108. These spur gears are normally free wheeling on their respective drive shafts 106 and 108 but either gear may be drivingly connected to its respective drive shaft by means of one or the other of the electrically operated clutches 120 and 122 respectively, only one or the other of said clutches is engaged at a time to drive idler 110 from one or the other shafts 98 or 104 as desired. After the upper member 18 has been driven to its desired position around bearing 16, the respective clutch is disengaged and a brake means 124 carried on the stationary shaft 126 engages idler 110 to positively hold the upper member 18 in a fixed position on its bearing 16 relative to the housing 12.

The upper member takes the form of a hollow elongated body having an inner end mounted on bearing 16 and an outer end that supports bearing 22 upon which the second articulated element 20 is mounted to oscilate in a generally vertically disposed plane. As shown in FIGS. 3, 4 and 6, the second element is driven in its oscilating motion by a pair of free wheeling spur gears 130 and 132, one of each of the pair being mounted on the oppositely rotating drive shafts 98 and 104. Gears 130 and 132 each has a cooperating clutch 134 and 136 respectively for coupling either one gear or the other to its drive shaft, and gears 130 and 132 mesh with idler gear 138 that free wheels about the stationary shaft 126. A suitable brake 140 cooperates between idler 138 to hold the idler stationary when once the position of the second element 20 has been established. Idler 138 meshes also with a spur gear 142 that is integral with a bevel gear 144 that meshes with a bevel gear 146. This gear 146 is integral with a tubular drive element 148 that is rotatably mounted within the upper member and extends from the inner end thereof to the outer end of the upper member 18. At the outer end of the tubular drive means 148 as best seem in FIG. 4 a bevel gear 150 is integral with the tube 148 which gear drives the meshing bevel gear 152 keyed to shaft 154 that forms the input drive to another epicyclic gear means indicated by arrow 156, the output of which is connected to the inner end of the second element 20 supported on bearing 22 to oscilate the second element about this bearing.

The second element may be driven in one direction or the other about bearing 22 depending upon which of the clutches 134 or 136 is energized. When the second element has reached its final position the respective clutch is deenergized and brake 140 is energized to lock idler 138 to shaft 126 so that this gear train is immobilized and member 20 is held in an immovable position relative to the upper member 18.

The second element 20 includes an elongated housing that extends from the inner end of the element from the bearing 22 to the outer end that supports bearing 23 where an angulating member 24 is mounted. As shown in FIG. 4, this member is carried on shaft 23 supported in bearing means 162 to rotate about the center line of shaft 23, the shaft having an axis disposed generally at a right angle with respect to the longitudinal axis of the second element. As shown in FIGS. 4 and 6 the section 24 is driven to oscilate in one direction or the other with bearing shaft 23 by a gear train driven from either one of shafts 98 and 104 that includes the free wheeling spur gears 166 and 168. These gears mesh with idler 170 that free wheels around fixed shaft 126 and the idler meshes with spur gear 172 that free wheels around bearing 16 at the upper portion of the housing and gear 172 is integral with bevel gear 174 that meshes with bevel gear 176. Bevel gear 176 is integral with a tubular drive sleeve 178 that extends from the inner end of the upper member 18 to its outer end. At this outer end, the tubular sleeve drives a bevel gear 180 that meshes with bevel gear 182 that free wheels around the bearing 22. The gear 182 drives a meshing bevel gear 184 integral with a tubular drive sleeve 186. The sleeve 186 extends through the housing of the second element 20 from its inner to the outer end thereof and is rotatably mounted on suitable bearings so that a bevel gear 188 integral with outer end of the tube 186, meshes with a set of bevel teeth on the arcute rack 190 integral with the angulating section 24. Suitable electrically driven clutch means 192 and 194 cooperate with spur gears 166 and 168 on the oppositely rotating drive shafts 98 and 104 and idler 170 to either oscilate section 24 in one direction or the other, or brake means 196 may be engaged with idler 170 to hold it fixed with shaft 126 to hold the element 24 in a programmed position.

The angulating member 24 supports a twisting means 26 that may be rotated 360° about a longitudinal axis through member 24. As shown in FIGS. 4 and 6, a drive train for rotating section 24 includes spur gears 202 and 204 together with their clutches 206 and 208. These gears free wheel on drive shafts 98 and 104 until either one of their respective clutches are engaged and both gears 202 and 204 mesh with idler 210 that free wheels about fixed shaft 126 until its brake 212 is engaged. The idler 210 meshes with spur gear 214 that is integral with bevel gear 216 that free wheels about bearing 16. The bevel gear 216 meshes with bevel gear 218 keyed to a drive shaft 220 that is mounted for rotation independently of and concentrically within drive sleeve 178. The drive shaft 220 extends from the bearing 16 in the upper part of the housing 12 through the upper member to adjacent bearing 22 at the outer end of the upper member. At this end the drive shaft 220 has a bevel gear 222 keyed to it that meshes with bevel gear 224 that free wheels around the bearing 22. The gear 224, drives bevel gear 226 keyed to a drive shaft 228 that is independently, rotatably and concentrically mounted within sleeve 186. The drive shaft 228 extends from the bearing 22 to a position adjacent the bearing 23 and has a bevel gear 230 keyed to it. Gear 230 meshes with bevel gear 232 that free wheels around bearing shaft 23 and gear 232 drives bevel gear 234 keyed to the inner end of a drive shaft 236. The shaft 236 extends through angulating member 24 and has a spur gear 238 keyed to its outer end. Spur gear 238 meshes with gear teeth integral with the inner wall of twisting member 26 to rotate 26 on bearings 200 supported on member 24.

As either the clutch means 206 or 208 is engaged, this above described gear train rotates twisting section 26 about its longitudinal axis in one direction or the other depending upon the direction of rotation of shaft 98 or 104 from which the train is powered. After the desired position of section 26 has been attained brake 212 that engages idler 210 with stationary shaft 126 may be set to hold section 26 stationary.

As shown in FIGS. 3, 4 and 6, the load engaging means 28 and 30 may be bell crank shaped elements and are mounted to pivot toward and away from each other on bearings 250 and 252 supported in the twisting element 26. These load engaging elements are positively driven to open or close relative one to the other from either one of the oppositely rotating drive shafts 98 and 104 through the gear train starting with free wheeling spur gears 254 and 256 and their respective clutches 258 and 260. These spur gears mesh with idler 260 that free wheels on shaft 126 and in turn meshes with spur gear 262. A brake 264 cooperates between idler 260 and fixed shaft 126 to hold the load engaging means 28 and 30 stationary when desired. The spur gear 262 is integral with the drive sleeve 265 that is mounted for freewheeling rotation with respect to bearing shaft 16. Drive sleeve 265 has an integral bevel gear 266 that meshes with bevel gear 268 keyed to drive shaft 270 that extends from adjacent bearing 16 to adjacent bearing 22. The shaft 270 is mounted concentrically within drive sleeve 148 but is independantly rotatable with respect thereto and at its end adjacent bearing 22, shaft 270 drives bevel gear 272 keyed thereto. Gear 272 meshes with bevel gear 274 that free wheels about the bearing shaft 22. Gear 274 meshes with bevel gear 276 keyed to drive shaft 278 which extends through the second articulated element 20, the shaft being rotatably supported therein to extend longitudinally through the length of this element to bearing 23 that supports the angulating element 24. At this end of drive shaft 278 a bevel gear 280 is keyed to the shaft and gear 280 meshes with bevel gear 282 that free wheels around the bearing shaft 23. Gear 282 meshes with a bevel gear 284 keyed to a drive shaft 286 which is rotatably mounted in the angulating section 24 and has a spur gear 288 keyed to its outer end. Spur gear 288 meshes with spur gear 290 that is keyed to a drive shaft 292 rotatably mounted in twisting section 26. The outer end of shaft 292 is threaded to engage in a movable nut means 294. The moveable nut means may have recirculating ball bearing thread means for cooperating with the threads on shaft 292, so that when shaft 292 is rotated in one direction or the other under the control of either one or the other of clutches 258 and 260 for connecting this gear train to either drive shaft 98 or 104, the nut means is reciprocated along the longitudinal axis of shaft 292. The nut is pivotally linked to one arm of each of the bell crank shaped load engaging elements 28 and 30 to drive them toward or away from each other, or these elements may be held stationary when brake 264 is engaged.

Ihe above described tool is preferably driven by an electrical motor that is fully enclosed within the housing element 12. A suitable power source supplies the power to drive the motor and operate the clutch means and brake means. It will be noted that all of electrical elements including the motor, electrically operated clutches and brake means are enclosed within the protective housing and are built into the respective gear trains adjacent the respective oppositely rotating drive shaft means 40 and 46, and 98 and 104 together with the respective gears 48, 50, 52, 54 and gears 106, 108, 130, 132, 166, 168, 202, 204, 254 and 256, and their cooperating idler gears, all of which are fully enclosed within housing 12. Such an arrangement is preferable, to provide an automated machine for use in rugged environments. In this tool, the more delicate elements such as the electrical equipment can be more easily insulated and protected within the housing where they can all be reached for servicing at the one location when attention is required. The exposed articulated elements can also be constructed to provide housing enclosures for the gear trains passing through them.

The various clutches and brake means described above may all be operated in a prescribed sequence by known computer controlled circuitry to effect a desired manipulative series of motions. Certain elements may be driven to move in a desired direction one relative to the other simultaneously while other elements are held stationary and at other times all of the drives may be in operation or all of the elements may be held in a positively locked position. When an article has been engaged between the load engaging elements 28 and 30, the various selected drives for the other elements of the tool may be engaged in sequence to deliver the load to a work station. After the load has been properly positioned all the gear drive systems may then be immobilized by engaging their respective brake means until processing of the article at the work station has been completed. Thereafter the load may be delivered to an output station and deposited.

Making use of the epicyclic gear systems at the bearings for the articulated upper member and the second element provides a device for converting the high R.P.M. infeed force to a much slower motion with greatly increased lifting power in the load handling articulated elements.

Suitable motion limiting means may of course be provided where undue movement of one or the other of the elements of the articulated mechanism one relative to the other would interfere with the proper operation of the parts. All of the electrical and mechanical control means suggested for use above, are well known in the art.

The above describes the preferred form of this invention. It is possible that modifications thereof may occur to those skilled in the art that will fall within the scope of the following claims.

What is claimed is:

1. A production tool comprising a support, a housing mounted on said support for selective rotation in either a clockwise or counterclockwise direction about a vertical axis through the center thereof; said housing having an upper portion; an articulated load carrying means supported by said housing including an upper member having a bearing supported inner end and an outer end, said bearing supported inner end of said upper member being carried by a bearing means on said housing so that said upper member can be selectively angularly driven to oscillate in a vertical plane; a second element having an inner bearing end and an outer end at the opposite ends of its longitudinal axis that extends from said inner end to said outer end thereof; bearing means for carrying the inner end of said second element at the outer end of said upper member; said second element being adapted to be selectively driven to swing in either direction through an arc in a vertical plane; an angulating member and a twisting member; a support means at said outer end of the second element for carrying said angulated and twisting members, said support means including bearing means for supporting the angulating member on a bearing having an axis whereby the angulating member can selectively be angularly driven through an arc in a vertical plane and said support means also including bearing means having an axis to permit selective driving rotation of the twisting member through 360° in a second plane that is perpendicular to said plane of movement of the angulating means; a pair of load engaging means at least one of which is adapted to be opened and closed relative to the other; said load engaging means being operatively supported on said twisting member; a drive for said tool consisting of a single electric motor drive mounted within said housing; a plurality of electrically operated clutch means and brake means in said housing; said clutch and brake means cooperating with gear means, and drive shafts for operating said housing, said upper member, said second element, said angulating and said twisting and said load engaging means; said motor providing power and said clutch and brake means all of which are enclosed within said housing being operative for cooperating therewith to open and close said load engaging means and drive said articulated means all independently one with respect to the other, to perform a coordinated useful series of motions; and control means for activating said clutch and brake means for selectively moving and then inactivating the drives for positioning said housing and operating said articulated load carrying means.

2. A tool as in claim 1 wherein said certain gear means includes a drive connection between the motor and a gear set that includes two meshing spur gears keyed to two rotatably mounted drive shafts that are rotated in opposite directions one relative to the other, two pairs of spur gears mounted two on each of said drive shafts each being oppositely aligned with one of the gears on the other shaft, said two pairs of gears all being carried to normally free wheel relative to their respective shafts, four clutch means one cooperating with each of said free wheeling gears which clutches may be selectively operated to couple its respective gear to the drive shaft on which it is mounted, a worm gear drive that includes a shaft to turn the worm that meshes with a worm wheel keyed to a drive shaft for operating means to move said housing in one longitudinal direction or in the reverse direction, another worm gear drive means including a shaft for turning another drive system for operating means to rotate said housing in one direction or the other, a spur gear keyed to the shaft for driving said worm to move said housing longitudinally, a free wheeling idler gear meshing with two of said oppositely disposed free wheeling spur gears on each of said shafts and also meshing with the spur gear keyed to the drive shaft for the longitudinal drive worm, a spur gear keyed to said shaft of said another drive system for driving the housing rotating means, a second free wheeling idler gear meshing with the second pair of said oppositely disposed spur gears on each of said shafts and also meshing with the spur gear keyed to said shaft of said another drive system for rotating the housing, means for selectively activating one of said clutches that are operative to connect one or the other of one of the aligned pair of spur gears to its respective drive shaft when it is desired to move said housing in one longitudinal direction or the other, and means for selectively activating one of said clutches to connect one or the other of said second pair of aligned oppositely disposed spur gears to its respective shaft when it is desired to rotate said housing in one direction or the other.

3. A tool as in claim 1 wherein said certain gear means is operative to drive said upper member angularly in said vertical plane and wherein said bearing means for said upper member is located at said upper portion of said housing and includes a horizontally disposed bearing shaft, said inner bearing end of said upper member being mounted on said bearing shaft for oscillating said upper member about said bearing, said certain gear means including a pair of meshing spur gears adapted to be driven from said motor, each gear of said pair being keyed to a driven shaft whereby the respective shafts are made to operate in opposite directions of rotation, a pair of spur gears being mounted for free wheeling one on each of said respective driven shafts, an idler gear rotatably mounted within said housing for engaging with both of said free wheeling spur gears, a further spur gear meshing with said idler gear, the further gear being mounted to free wheel about said horizontal bearing shaft for said upper member, said further spur gear being keyed to an input drive to an epicyclic gear train concentric with said further spur gear, said epicyclic train having an output connected to said inner bearing end of said upper member, clutch and brake means that are alternately operative, said brake means being adapted to coact with said idler gear, clutch means coacting respectively with the respective free wheeling spur gears mounted on said oppositely driven shafts, said clutch and said brake means being selectively operative to cause said upper member to oscillate in one direction in said plane into a preselected position and then be locked in such position.

4. A tool as in claim 1 wherein said certain gear means operative to swing said second articulated element about said inner bearing end thereof and includes a gear train driven from said motor, said train including a pair of meshing spur gears adapted to be driven by said motor, each gear of said pair being keyed to a separate driven shaft whereby the respective shafts are made to operate in opposite directions of rotation, a pair of spur gears being mounted for free wheeling one on each of said respective driven shafts, an idler gear rotatably mounted within said housing for engaging with both of said free wheeling spur gears, a further spur gear meshing with said idler gear, said further spur gear being mounted to free wheel about said bearing for said inner end of said upper member, a bevel gear integral with said further spur gear, a second bevel gear meshing with said first bevel gear to be rotated about an axis generally disposed at a right angle to the horizontal bearing in the upper portion of the housing for the inner end of said upper member, a tubular drive means integral with said second bevel gear, said upper member having an axis extending from said inner bearing end to said outer end, said tubular drive means being mounted to rotate about said axis and said tubular means extending from said second bevel gear to near said bearing means at said outer end of said upper member, said outer end bearing means having a horizontal axis, a third bevel gear integral with said tubular member disposed near said outer end bearing, a fourth bevel gear meshing with said third bevel gear, said fourth bevel gear being mounted to rotate concentrically around said horizontal axis, an epiclyclic gear train having a driving gear and a driven output gear disposed to rotate concentrically around said horizontal axis, said fourth bevel gear being made integral with the driving gear in said epicyclic gear train and the output gear of said epicyclic gear train being drivingly connected to said second element to swing said second element about the outer end bearing of said upper member, clutch means operatively connected to said free wheeling spur gears on said respective driven shafts, a brake means operatively connected to said idler gear that meshes with said two free wheeling spur gears, said clutch means and said brake means being selectively operative, whereby said second element may be programmed to be driven to oscilate in one direction about said outer end bearing of the upper member in a desired direction and locked in a selected position when said brake is operated.

5. A tool as in claim 1 wherein said certain gear means is operative to drive said angulating means angularly in said arc and selective rotation of said twisting member in said second plane, said gear means including a gear train that includes a pair of intermeshing spur gears keyed respectively to two driven shafts that are rotatively driven in opposite directions, two pairs of free wheeling spur gears the two gears of each pair being mounted respectively on said two oppositely driven drive shafts, a pair of free wheeling idler gears, one of each of said idler gears meshing with two of said free wheeling spur gears one of which is mounted on one of said two driven shafts and the other free wheeling spur gears being mounted on the other drive shaft, a spur gear meshing with one of said idler gears and mounted to rotate concentrically around the axis of said bearing for the inner end of said upper member located in the upper portion of said housing, a bevel gear concentrically arranged and driven with said last named spur gear, a second bevel gear meshing with said concentric bevel gear, said second bevel gear being integral with one end of a tubular drive means, said tubular drive means rotating about an axis that is generally perpendicular to the axis of said bearing, the opposite end of said tubular drive means being rotatably supported adjacent said bearing at the outer end of said upper member, a free wheeling bevel gear supported to rotate concentrically about the axis of said outer end bearing, an intermediate bevel gear integral with said opposite end of said tubular drive means, said intermediate bevel gear meshing with said concentric bevel gear, said free wheeling concentric bevel gear meshing with a third bevel gear that rotates about an axis generally perpendicular to the axis of said outer end bearing of the upper member, said third bevel gear being integral with one end of a second tubular drive means that extends through said second articulated element from its inner bearing end to its outer end that is adjacent the axis of said angulating support means at the outer end of said second element about which said angulating means is angularly driven, a fourth bevel gear integral with the end of said tubular member adjacent said bearing at the outer end of said second element, a fifth bevel gear meshing with said fourth bevel gear, said fifth bevel gear being rotatable concentrically about said axis of the bearing at said outer end of the second element about which said angulating member is angularly rotatable, a sixth bevel gear meshing with said fifth bevel gear, said sixth bevel gear being coupled to a drive shaft that extends to said bearing means that permits said 360° rotation, a spur gear coupled to said last named drive shaft, said twisting member having an internal spur gear integral therewith and said last named spur gear meshing with said internal gear whereby said twisting member may be rotated as desired through as much as 360°, and said gear means also includes another gear train that includes said second idler gear and a spur gear that is mounted to free, wheel around the axis of said bearing in the upper portion of said housing, said last named spur gear meshing with said second idler gear, a bevel gear integral with said last named spur gear, a second bevel gear meshing with said integral last named bevel gear, a drive shaft having one end coupled to said last named second bevel gear, said drive shaft being concentrically positioned within and extending entirely throughout the length of said tubular drive means with the opposite end of the shaft extending therefrom, a bevel gear coupled to the extending end of said drive shaft, another bevel gear mounted to free wheel about the axis of said outer end bearing that meshes with said bevel gear on said extending end, another bevel gear meshing with said outer end bearing mounted bevel gear, said another bevel gear being coupled to a drive shaft that extends concentrically within and extending entirely through the length of said second tubular drive means, a bevel gear coupled to the extending end of said last named drive shaft, a bevel gear integral with said angulating member and mounted to rotate concentrically about the axis about which said angulating member oscilates angularly, said last named bevel gear meshing with said bevel gear at the extending end of said last named drive shaft, clutch means for coacting with said free wheeling spur gears on said oppositely rotating drive shafts, brake means to cooperate with said idler gears meshing with said spur gears, said clutch means and said brake means being alternately operative to effect the driving of said angulating and twisting members to a desired angular and rotated position and thereafter the brake means being operative to hold said members in their desired positions.

6. A tool as in claim 1 wherein said gear means is operative to open and close said load engaging means one relative to the other, said gear means including a gear train that includes a pair of intermeshing spur gears keyed respectively to two driven shafts that are rotatably driven in opposite directions, a pair of spur gears free wheelingly mounted one each on each of said drive shafts, an idler gear meshing with each of said free wheeling gears, a spur gear mounted for free wheeling and concentric rotation around the axis of said bearing in the upper portion of said housing, said idler gear meshing with said last named spur gear, a first bevel gear mounted to be concentric with and rotatable about said bearing axis, means for drivingly connecting said bevel gear to said last named spur gear, a second bevel gear meshing with said first named bevel gear, a drive shaft coupled to said second bevel gear, said drive shaft being rotatably mounted to rotate about an axis generally perpendicular to the axis of said upper housing bearing, said drive shaft extending through said upper articulated member from said upper housing bearing means to have an end adjacent said outer end bearing in the upper member, a third bevel gear coupled to said extending end of said drive shaft, a fourth bevel gear mounted to rotate about said axis of the bearing at said outer end of the upper member and meshing with said last named bevel gear, a fifth bevel gear rotatable about an axis parallel to said longitudinal axis of said second articulated element, said fifth bevel gear meshing with said fourth bevel gear, another drive shaft coupled to said fifth bevel gear, said another drive shaft extending to said outer end of said second element, a sixth bevel gear coupled to said another drive shaft adjacent said driven end, a seventh bevel gear meshing with said sixth bevel gear, said seventh bevel gear being mounted to rotate about the axis about which said angulating member turns, an eighth bevel gear meshing with said seventh bevel gear and coupled to a drive shaft extending through the angulating members and toward the load engaging elements, said drive shaft having a threaded end, a nut means for cooperating with said threaded end which nut means is adapted to be reciprocated longitudinally along said threaded drive shaft, at least one of said load engaging elements being a bell crack means pivotally mounted on said twisting member, and means to connect said at least one pivoting bell crank load engaging means to said nut means whereby movement of said nut means causes said load engaging means to oscilate about its pivot to engage and release an object positioned between the load engaging means, clutch means and brake means for cooperating with said free wheeling spur gears mounted on said oppositely rotating driven shafts and for engaging said idler gear whereby to drive said finger means to engage an object between the load engaging means or release an object from the grasp of said means.

* * * * *